(12) United States Patent
Li et al.

(10) Patent No.: US 11,645,254 B2
(45) Date of Patent: May 9, 2023

(54) DATABASE INDEX MODIFICATION

(71) Applicant: International Business Machines Corporation, Armonk, NY (US)

(72) Inventors: Shuo Li, Being (CN); Xiaobo Wang, Beijing (CN); Sheng Yan Sun, Beijing (CN); Hong Mei Zhang, Beijing (CN); Meng Wan, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/448,882

(22) Filed: Sep. 25, 2021

(65) Prior Publication Data

US 2023/0100926 A1   Mar. 30, 2023

(51) Int. Cl.
*G06F 16/22* (2019.01)
*G06F 16/182* (2019.01)

(52) U.S. Cl.
CPC ........ *G06F 16/2228* (2019.01); *G06F 16/182* (2019.01)

(58) Field of Classification Search
CPC ............................ G06F 16/2228; G06F 16/182
See application file for complete search history.

(56) References Cited

U.S. PATENT DOCUMENTS

| | | | |
|---|---|---|---|
| 6,532,305 B1 * | 3/2003 | Hammen | G06K 9/6282 382/160 |
| 8,176,023 B2 | 5/2012 | Graefe | |
| 8,745,005 B1 * | 6/2014 | DeSouter | G06F 11/1471 707/648 |
| 2013/0174165 A1 * | 7/2013 | Chopra | G06F 11/1482 707/E17.001 |
| 2014/0074841 A1 * | 3/2014 | Majnemer | G06F 16/2246 707/E17.002 |
| 2014/0317158 A1 * | 10/2014 | Jiang | G06F 16/13 707/822 |
| 2018/0060382 A1 | 3/2018 | Helak et al. | |
| 2020/0293407 A1 * | 9/2020 | Depoutovitch | G06F 11/1469 |
| 2020/0364211 A1 | 11/2020 | Li et al. | |

OTHER PUBLICATIONS

Marcel Kornacker, Douglas Banks, seen on wayback machine Oct. 24, 2020, High-Concurrency Locking in R-Trees, pp. 1-12, https://dsf.berkeley.edu/papers/vldb95-rtree.pdf (Year: 2020).*
University of Wisconsin Madison, seen on wayback machine Nov. 25, 2013, "Lock-based Concurrent Data Structures", pp. 1-16, https://pages.cs.wisc.edu/~remzi/OSTEP/threads-locks-usage.pdf (Year: 2013).*
Anonymous, IP.com Prior Art Database Technical Disclosure, IPCOM000209837D—Methods to Minimize Data Contention in A Cluster Database System, Aug. 17, 2011, IP.com.

* cited by examiner

*Primary Examiner* — Allen S Lin
(74) *Attorney, Agent, or Firm* — Yee & Associates, P.C.

(57) ABSTRACT

Modifying an index for a database is provided. An index tree for the database is traversed by: identifying a next node in the index tree, requesting a lock of the next node in the index tree, responsive to locking of the next node in the index tree, releasing a lock of a current node of the index tree, and making the next node in the index tree the current node of the index tree, until the current node of the index tree is a leaf node of the index tree. Responsive to determining to split the leaf node, the lock of the leaf node is released and, after releasing the lock of the leaf node, a lock of a non-leaf node parent of the leaf node in the index tree is requested.

12 Claims, 10 Drawing Sheets

DATABASE INDEX MODIFICATION

BACKGROUND

1. Field

The disclosure relates generally to databases and more specifically to modifying indexes for databases.

2. Description of the Related Art

Databases are organized collections of data that can be accessed electronically from a computer system. Data in a database may be organized in a series of tables having rows and columns of data.

Indexes are commonly used in databases to quickly locate data without having to search every row in a database table every time a database table is accessed. When a new row is inserted into a database table, a corresponding index key needs to be inserted into the indexes for the database as well.

A B+ tree is a commonly used data structure for implementing database indexes. The leaf pages of a B+ index tree represent ranges of key values. To insert a new key into a B+ tree structured database index, a leaf page of the index tree where the new key belongs is identified based on the value of the new key. Key values belonging to the same range will be inserted into the same leaf page.

SUMMARY

According to one illustrative embodiment, a computer-implemented method of modifying an index for a database is provided. A computer traverses an index tree for the database by: identifying a next node in the index tree, requesting a lock of the next node in the index tree, responsive to locking of the next node in the index tree, releasing a lock of a current node of the index tree, making the next node in the index tree the current node of the index tree, determining whether the current node of the index tree is a leaf node of the index tree, and, responsive to determining that the current node of the index tree is not a leaf node, repeating the steps of identifying the next node, requesting the lock of the next node, releasing the lock of the current node, making the next node the current node, and determining whether the current node is a leaf node. Responsive to determining that the current node of the index tree is the leaf node, the computer determines whether to split the leaf node. Responsive to determining to split the leaf node, the computer releases the lock of the leaf node and, after releasing the lock of the leaf node, requests a lock of a non-leaf node parent of the leaf node in the index tree.

According to other illustrative embodiments, a computer system and computer program product for modifying an index for a database are provided.

DETAILED DESCRIPTION

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The illustrative embodiments recognize and take into account various considerations. For example, the illustrative embodiments recognize and take into account that the number of keys that may be assigned to a leaf node in an index tree for a database are limited. The adding of a key to an index tree for a database in response to the insertion of data into the database may require splitting of the index tree starting at a leaf node. Splitting of an index tree thus may impact insert performance of the database.

Currently, a database index may be locked during an index splitting operation. For example, a database index may be locked during an index splitting operation at the entire tree level for a non-partitioned index or at the index partition level for a partitioned index. Only one index splitting operation may be performed at a time in a locked index tree. Therefore, the performance of index splitting operations is currently limited by the serialization imposed by locking of the index tree. Index splitting performance using current methods may be particularly limited for distributed database systems in which multiple databases share data.

Illustrative embodiments provide a method and system for improving the performance of insert operations in a database system by providing for multiple index splitting operations being performed at the same time in an index tree for a database. Illustrative embodiments promote the degree of parallel splitting operations in an index tree using sub-tree locks, in which the portion of an index tree that is locked during a particular splitting operation is limited, so that other splitting operations may be performed at the same time in other parts of the index tree.

In accordance with an illustrative embodiment, a footprint stack is used to track the path through an index tree that is followed when the index tree is traversed to find a leaf node of the index tree to be modified in response to a database insert operation. Each entry in the footprint stack contains node information for a node of the index tree that is traversed. For example, such node information may include page buffer, page free size, and a page modified timestamp indicating the last time that the node was modified. When an index split operation is performed, the information in the footprint stack may be used to identify the parent node of the node to be split. Locks then may be requested for the sub-tree starting with the identified parent node to the leaf node being split, according to the path recorded in the footprint stack.

In accordance with an illustrative embodiment, two or more index split operations may be performed in parallel in a database index tree, as long as there is no conflict between exclusive sub-tree locks. Split operations that cause a conflict between sub-tree locks cannot be started until the sub-tree lock causing the conflict is released. In accordance with an illustrative embodiment, if a node of an index tree is changed before a sub-tree lock request for the node is processed, the index tree may be re-traversed starting at an appropriate node of the index tree that may be identified using the footprint stack.

Figure 1:
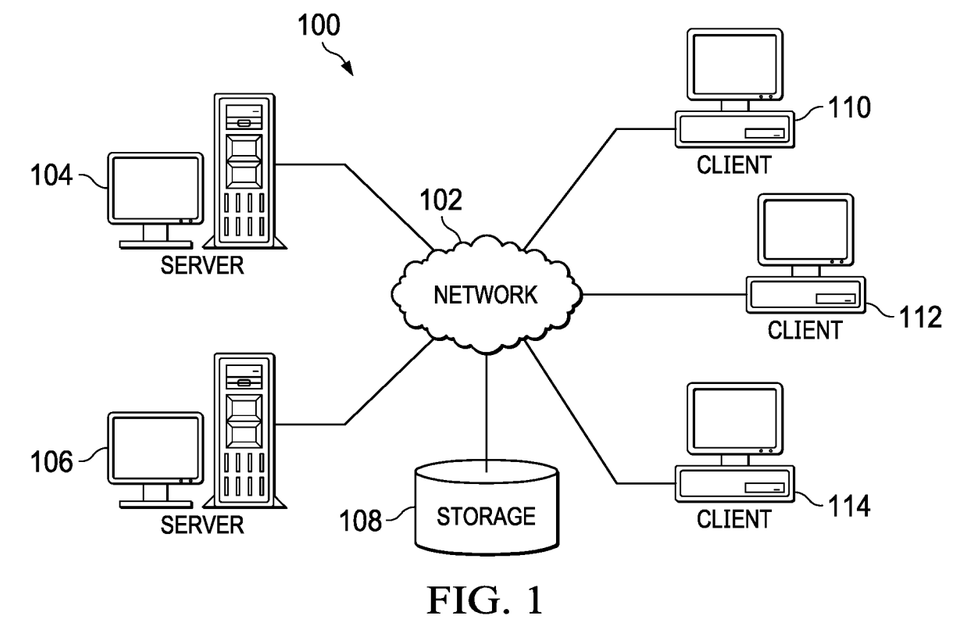
FIG. 1 is a pictorial representation of a network of data processing systems in which illustrative embodiments may be implemented.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client computer 110, client computer 112, and client computer 114 connect to network 102. Client computers 110, 112, and 114 can be, for example, computers, workstations, or network computers. In the depicted example, server computer 104 provides information, such as boot files, operating system images, and applications to client computers 110, 112, and 114. In this illustrative example, server computer 104, server computer 106, storage unit 108, and client computers 110, 112, and 114 are network devices that connect to network 102 in which network 102 is the communications media for these network devices.

Client computers 110, 112, and 114 are clients to server computer 104 in this example. Network data processing system 100 may include additional server computers, client computers, and other devices not shown. Client computers 110, 112, and 114 connect to network 102 utilizing at least one of wired, optical fiber, or wireless connections.

Program code located in network data processing system 100 can be stored on a computer-recordable storage medium and downloaded to a data processing system or other device for use. For example, program code can be stored on a computer-recordable storage medium on server computer 104 and downloaded to client computers 110, 112, or 114 over network 102 for use on client computers 110, 112, or 114.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of" when used with reference to items, means one or more items. For example, "a number of different types of networks" is one or more different types of networks.

The phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Figure 2:
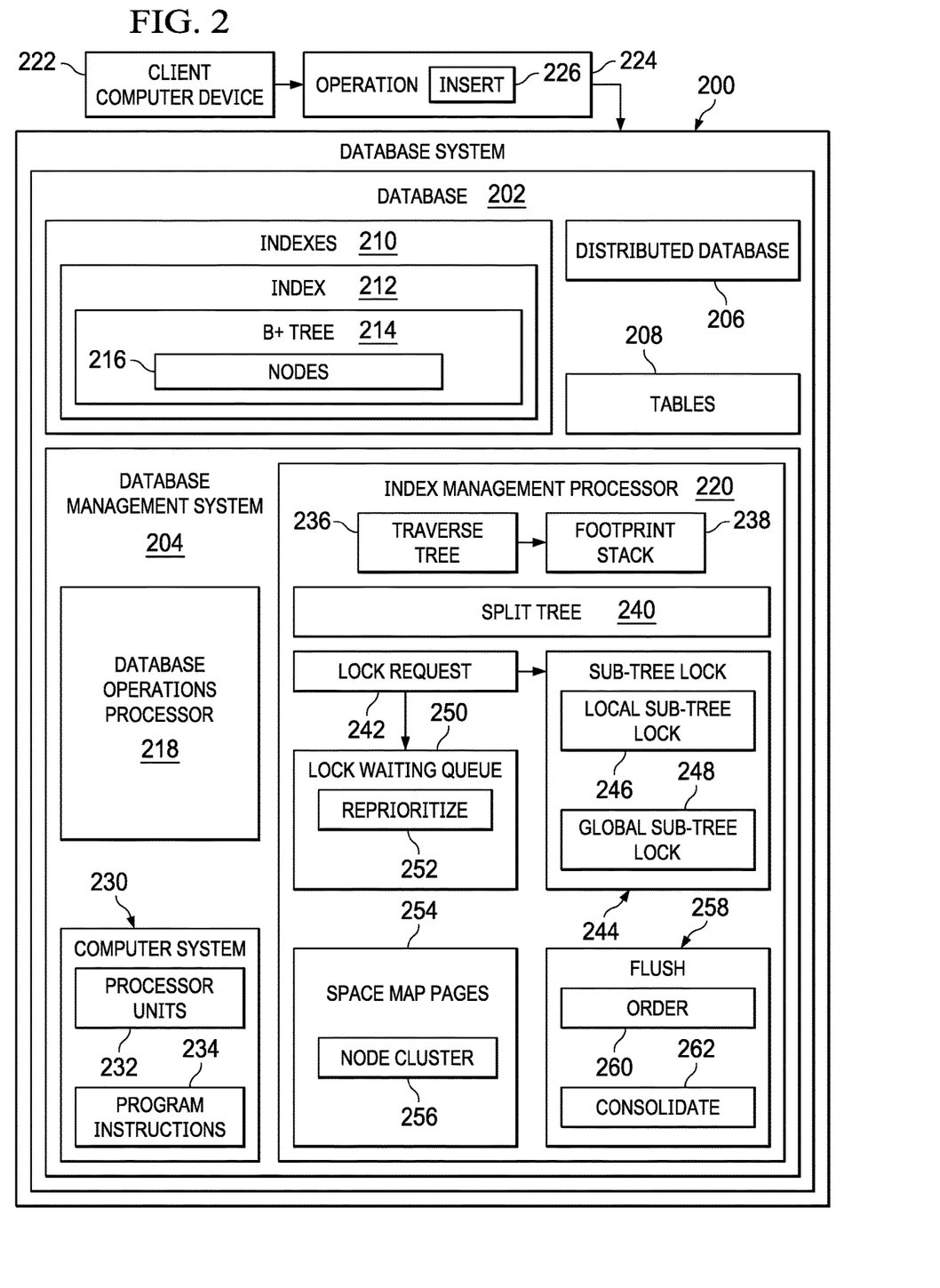
FIG. 2 is an illustration of a block diagram of a database system in accordance with an illustrative embodiment.

Turning to FIG. 2, an illustration of a block diagram of database system 200 is depicted in accordance with an illustrative embodiment. Database system 200 may include database 202 and database management system 204.

Database 202 may be any appropriate type of database. For example, without limitation, database 202 may be distributed database 206. In one example, distributed database 206 may include multiple databases that share data.

Database 202 may include any appropriate data organized in tables 208. Database 202 also includes indexes 210. Indexes 210 provide for quickly identifying the location of desired data in tables 208 without requiring searching though tables 208. For example, without limitation, each index 212 in indexes 210 may comprise B+ tree 214 including nodes 216 arranged in a tree structure. Nodes 216 of index 212 include leaf nodes that may point to data in tables 208 and non-leaf nodes including keys that allow the leaf nodes that point to desired data in tables 208 to be identified efficiently.

Database management system 204 may include database operations processor 218 and index management processor 220. Database operations processor 218 may be configured to perform operations involving the data stored in tables 208 of database 202. Operations performed by database operations processor 218 may include operations to view or modify data in tables 208 of database 202. For example, without limitation, database operations processor 218 may process requests from client computer device 222 to view or modify data in tables 208. An example of one such operation 224 that may be requested from client computer device 222 and processed by database operations processor 218 is to insert 226 data into tables 208 of database 202.

Index management processor 220 is configured to maintain indexes 210 for database 202. For example, without limitation, index management processor 220 may be configured to modify indexes 210 appropriately in response to changes in the data in tables 208 of database 202. In particular, index management processor 220 may be configured to add keys to indexes 210 in response to additions to tables 208.

Database management system 204 can be implemented in software, hardware, firmware or a combination thereof. When software is used, the operations performed by database management system 204 can be implemented in program instructions configured to run on hardware, such as a processor unit. When firmware is used, the operations performed by database management system 204 can be implemented in program instructions and data and stored in persistent memory to run on a processor unit. When hardware is employed, the hardware may include circuits that operate to perform the operations in database management system 204.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 230 is a physical hardware system and includes one or more data processing systems. When more than one data processing system is present in computer system 230, those data processing systems are in communication with each other using a communications medium. The communications medium can be a network. The data processing systems can be selected from at least one of a computer, a server computer, a tablet computer, or some other suitable data processing system.

As depicted, computer system 230 includes a number of processor units 232 that are capable of executing program instructions 234 implementing processes in database management system 204 when database management system 204 includes software. As used herein, a processor unit in the number of processor units 232 is a hardware device and is comprised of hardware circuits such as those on an integrated circuit that respond and process instructions and program code that operate a computer. When a number of processors units 232 execute instructions for a process, the number of processors units 232 is one or more processors units that can be on the same computer or on different computers. In other words, the process can be distributed between processors units on the same or different computers in a computer system. Further, the number of processors units 232 can be of the same type or different types of processors units. For example, a number of processor units can be selected from at least one of a single core processor, a dual-core processor, a multi-processor core, a general-purpose central processing unit (CPU), a graphics processing unit (GPU), a digital signal processor (DSP), or some other type of processor unit.

Index management processor 220 is configured to traverse index tree 236 for index 212 when a new key is to be added to index 212 in response to an addition to tables 208 of database 202. Traverse index tree 236 identifies the leaf node of index 212 to which the new key belongs. In accordance with an illustrative embodiment, index management processor 220 adds node information to footprint stack 238 for each of nodes 216 of index 212 that is traversed during traverse index tree 236. Footprint stack 238 therefore provides a record of the path through index 212 that is traversed during traverse index tree 236.

Index management processor 220 also is configured to split index tree 240. For example, index management processor 220 may split index tree 240 when the addition of a new key to a leaf node of index 212 would cause the number of keys associated with the leaf node to exceed the number of allowed keys.

In response to determining that split index tree 240 is to be performed, index management processor 220 generates lock request 242 to implement sub-tree lock 244 on a portion of the index tree involved in split index tree 240. Index management processor 220 uses the information in footprint stack 238 to identify the nodes of the index tree to be included in sub-tree lock 244. For example, without limitation, footprint stack 238 may be used to identify the non-leaf node direct parent of the leaf node to be split.

Sub tree-lock 244 may be referred to as local sub-tree lock 246 with respect to the nodes in an index tree for a single database system that are locked by sub-tree lock 244. Sub-tree lock 244 may comprise global sub-tree lock 248 in distributed database 206, in which sub-tree lock 244 extends to corresponding nodes in index trees for multiple databases that share the same data.

Each lock request 242 may be stored in lock waiting queue 250 until lock request 242 can be processed. Each lock request 242 in lock waiting queue 250 may be processed in the order it is received in lock waiting queue 250. However, index management processor 220 may be configured to reprioritize 252 lock waiting queue 250 when lock waiting queue 250 includes lock requests for indexes 210 for multiple databases in distributed database 206. In this case, index management processor 220 may reprioritize 252 lock waiting queue 250 so that lock requests from the same database are processed together in a batch operation and the synchronous input/output on log write is consolidated.

In distributed database 206 with multiple databases that share data, space map pages 254 may be used to manage index pages for multiple databases. In this case, contention for lock requests may move to space map pages 254 when new pages are allocated. In accordance with an illustrative embodiment, node clusters 256 may be used to reduce contention against space map pages 254 access when new pages are allocated. In node clusters 256, nodes from different databases may only access specified space map pages 254. Nodes from different databases cannot access the same space map pages 254, thereby avoiding overlap and reducing contention.

Flushing is the final step in the indexing process that makes data searchable. Flushing updates the searchable index with information that is held in an index cache during the process of building or modifying the index. In accordance with an illustrative embodiment, index management processor 220 is configured to flush 258 the changes to nodes 216 of index 212 resulting from split index tree 240 in an appropriate order 260. An example of an appropriate order 260 for flush 258 is described in more detail below with reference to FIG. 9. Moreover, index management processor 220 may be configured to consolidate 262 flush 258 of changes to nodes 216 to support non-leaf node splitting and avoid synchronous input/output log write. An example of consolidate 262 flush 258 is described in more detail below with reference to FIG. 10.

The illustration of index management processor 220 in FIG. 2 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Figure 3:
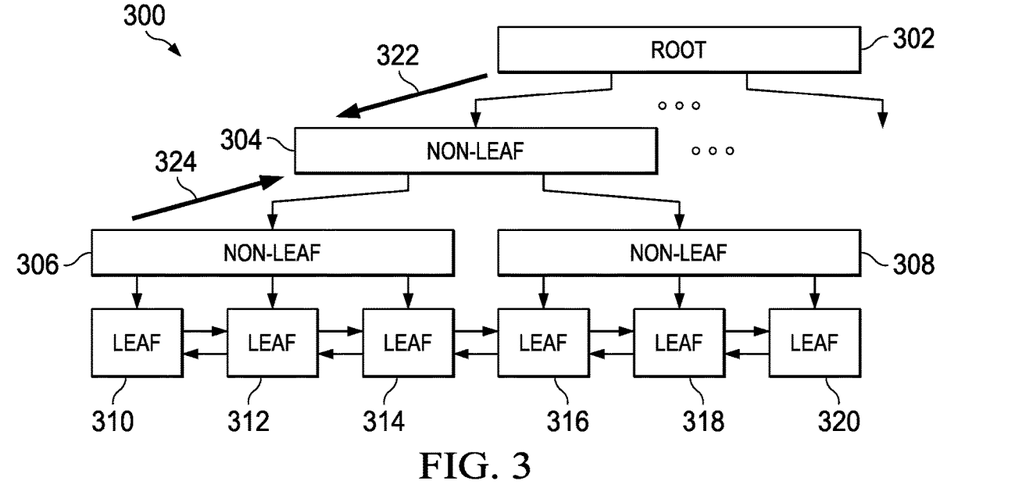
FIG. 3 is an illustration of an index tree for a database in accordance with an illustrative embodiment.

Turning to FIG. 3, an illustration of index tree 300 for a database is depicted in accordance with an illustrative embodiment. Index tree 300 is an example of one implementation of index 212 for database 202 in FIG. 2.

In this example, index tree 300 includes root node 302, non-leaf nodes 304, 306, and 308, and leaf nodes 310, 312, 314, 316, 318, and 320. An index tree in accordance with an illustrative embodiment may have more nodes, fewer nodes, or a different arrangement of nodes.

In accordance with an illustrative embodiment, when a new key is to be added to index tree 300, index tree 300 is first traversed in the direction 322 from root node 302 to identify the one of leaf nodes 310, 312, 314, 316, 318, and 320 to which the new key belongs. Starting from root node 302, the next node to be traversed is identified by comparing the value of the new key to key values in the current node under consideration. A lock request to lock the identified next node is made, and a lock on the current node is released when the next node is locked. The next node then becomes the current node, and the process continues until the appropriate one of leaf nodes 310, 312, 314, 316, 318, and 320 for the new key is identified. Furthermore, node information is added to a footprint stack for each node that is traversed.

When the appropriate one of leaf nodes 310, 312, 314, 316, 318, and 320 for the new key is identified, it is determined whether the leaf node needs to be split. If the leaf node does need to be split, the lock on the leaf node may be released, and a lock request to lock the non-leaf node direct parent of the leaf node may be made. The lock request for the split operation is thus directed in direction 324. The non-leaf node to be locked may be identified from the information stored in the footprint stack.

With the sub-tree lock implemented, the split operation may be performed. The sub-tree lock then may be released.

Figure 4:
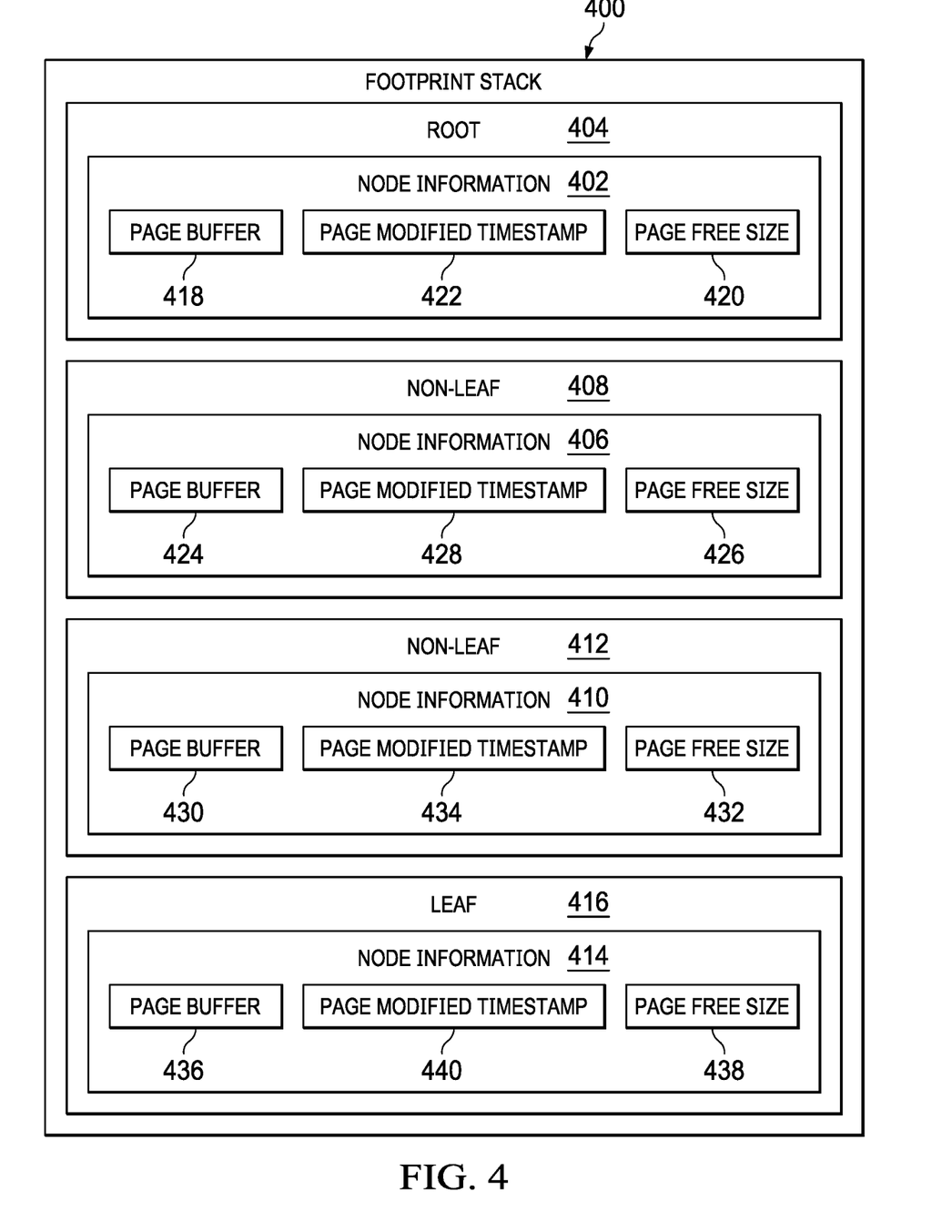
FIG. 4 is an illustration of a block diagram of a footprint stack in accordance with an illustrative embodiment.

Turning to FIG. 4, an illustration of a block diagram of footprint stack 400 is depicted in accordance with an illustrative embodiment. Footprint stack 400 is an example of one implementation of footprint stack 238 in FIG. 2.

Footprint stack 400 includes node information for nodes of an index tree that are traversed during traversal of the index tree to identify the appropriate leaf node for adding a new key to the index tree. In this example, footprint stack 400 includes node information 402 for root node 404, node information 406 for non-leaf node 408, node information 410 for non-leaf node 412, and node information for leaf node 416.

Node information 402 for root node 404 may include page buffer 418 for root node 404, page free size 420 for root node 404, and page modified timestamp 422 indicating the last time that root node 404 was changed. Node information 406 for non-leaf node 408 may include page buffer 424 for non-leaf node 408, page free size 426 for non-leaf node 412, and page modified timestamp 428 indicating the last time that non-leaf node 408 was changed. Node information 410 for non-leaf node 412 may include page buffer 430 for non-leaf node 412, page free size 432 for non-leaf node 412, and page modified timestamp 434 indicating the last time that non-leaf node 412 was changed. Node information 414 for leaf node 416 may include page buffer 436 for leaf node 416, page free size 438 for leaf node 416, and page modified timestamp 440 indicating the last time that leaf node 416 was changed.

Figure 5:
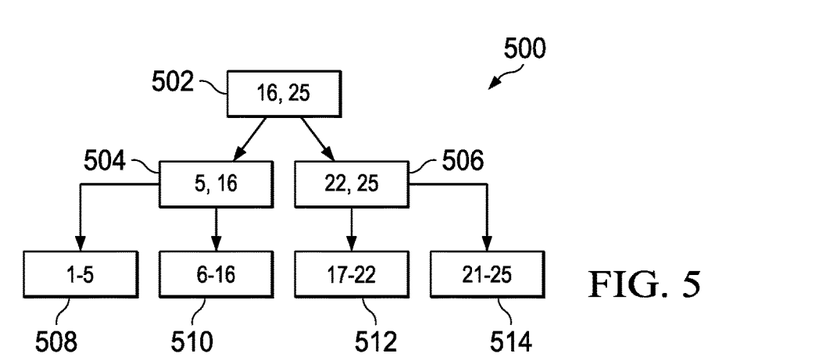
FIG. 5 is an illustration of an index tree for a database in accordance with an illustrative embodiment.

Turning to FIG. 5, an illustration of index tree 500 for a database is depicted in accordance with an illustrative embodiment. Index tree 500 is an example of one implementation of index 212 for database 202 in FIG. 2.

Index tree 500 includes nodes 502, 504, 506, 508, 510, 512, and 514. Node 502 is the root node and has keys with values 16 and 25. Node 504 is a non-leaf node and has keys with values 5 and 16. Node 506 is a non-leaf node and has keys with values 22 and 25. Node 508 is a leaf node with key values in the range 1-5. Node 510 is a leaf node with key values in the range 6-16. Node 512 is a leaf node with key values in the range 17-22. Node 514 is a leaf node with key values in the range 21-25.

Assume that a new key with the value 14 is to be added to index tree 500. Index tree 500 may be traversed to find the appropriate leaf node for the new key using the following process in accordance with an illustrative embodiment. A lock of root node 502 is requested. When root node 502 is locked, node information for root node 502 is added to a footprint stack and the value of the key to be added to index tree 500 is compared to the values of the keys for root node 502 to identify non-leaf node 504 as the next node to be traversed. A lock of non-leaf node 504 is then requested. When non-leaf node 504 is locked, the lock of root node 502 may be released, non-leaf node 504 becomes the current node, node information for non-leaf node 504 is added to the footprint stack, and the value of the key to be added to index tree 500 is compared to the values of the keys for non-leaf node 504 to identify leaf node 510 as the next node to be traversed. A lock of leaf node 510 is then requested. When leaf node 510 is locked, the lock of non-leaf node 504 may be released, leaf node 510 becomes the current node, and node information for leaf node 510 is added to the footprint stack.

Assume that it is determined that leaf node 510 needs to be split. In this case, the information in the footprint stack is used to identify non-leaf node 504 as the direct parent node of leaf node 510. A page modified timestamp for non-leaf node 504 stored as node information for leaf node 510 in the footprint stack may be compared to a current page modified timestamp for non-leaf node 504 to determine whether non-leaf node 504 was changed after non-leaf node 504 was traversed. If it is determined that non-leaf node 504 was changed, index tree 500 may be re-traversed starting at non-leaf node 504.

If it is determined that non-leaf node 504 was not changed after non-leaf node was traversed, the lock of leaf node 510 may be released and a sub-tree lock starting with non-leaf node 504 may be requested. When the sub-tree lock is established, the operation to split leaf node 510 may be performed. The sub-tree lock then may be released.

Figure 6:
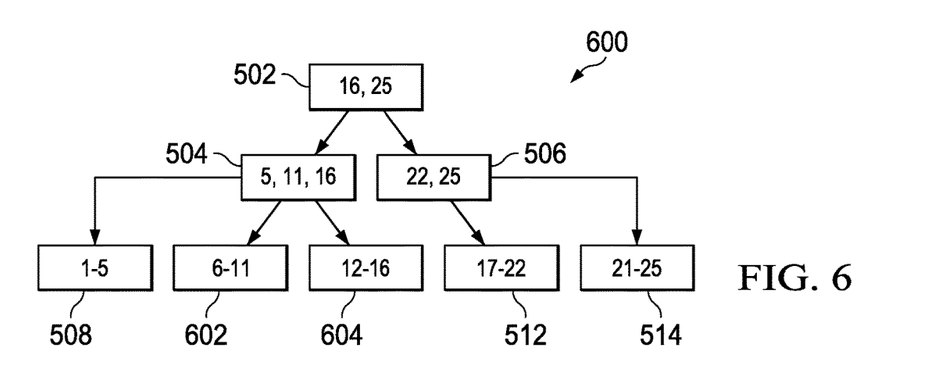
FIG. 6 is an illustration of the index tree of FIG. 5 after splitting a leaf node of the index tree in accordance with an illustrative embodiment.

Turning to FIG. 6, an illustration of index tree 500 of FIG. 5 after splitting a leaf node of the index tree is depicted in accordance with an illustrative embodiment. Index tree 600 shows index tree 500 of FIG. 5 after leaf node 510 of index tree 500 has been split. In this example, leaf node 510 of index tree 500 is split into leaf node 602 with key values in the range 6-11 and leaf node 604 with key values in the range 12-16. Non-leaf node 504 is modified to include three keys with values 5, 11, and 16, corresponding to leaf nodes 508, 602, and 604, respectively.

Figure 7:
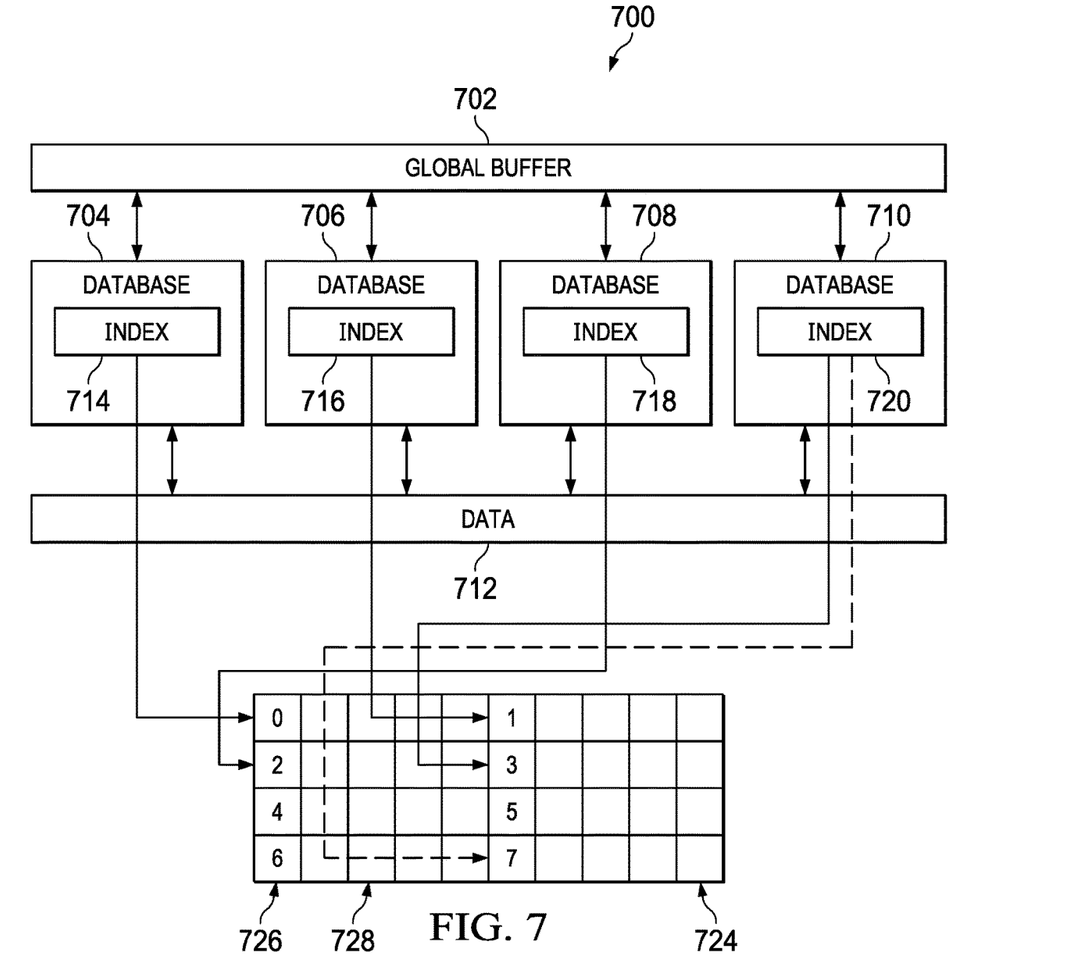
FIG. 7 is an illustration of node clusters to reduce contention against space map pages access when new pages are allocated in a distributed database with shared data in accordance with an illustrative embodiment.

Turning to FIG. 7, an illustration of node clusters to reduce contention against space map pages access when new pages are allocated in a distributed database with shared data is depicted in accordance with an illustrative embodiment. Distributed database 700 in FIG. 7 is an example of distributed database 206 in FIG. 2.

Distributed database 700 includes global buffer 702, database 704, database 706, database 708, and database 710.

Database 704, database 706, database 708, and database 710 share data 712. A distributed database in accordance with an illustrative embodiment may include more or fewer than four databases that share data. Database 704 includes index 714. Database 706 includes index 716. Database 708 includes index 718. Database 710 includes index 720.

Dataset structure 724 illustrates a relationship between space map pages 726 and index pages 728 for distributed database 700. Index pages 728 may be managed via corresponding space map pages 726. Lock contention between index pages 728 thus may become contention between space map pages 726 when new pages are allocated.

In accordance with an illustrative embodiment, node clusters may be used to reduce contention against space map pages 726 access when new pages are allocated. For example, database nodes may be restricted so that different database nodes cannot access the same space map page, thereby avoiding overlap. In this example, database 704 may only access space map pages 0 and 4. Database 706 may only access space map pages 1 and 5. Database 708 may only access space map pages 2 and 6. Database 710 may only access space map pages 3 and 7.

Figure 8:
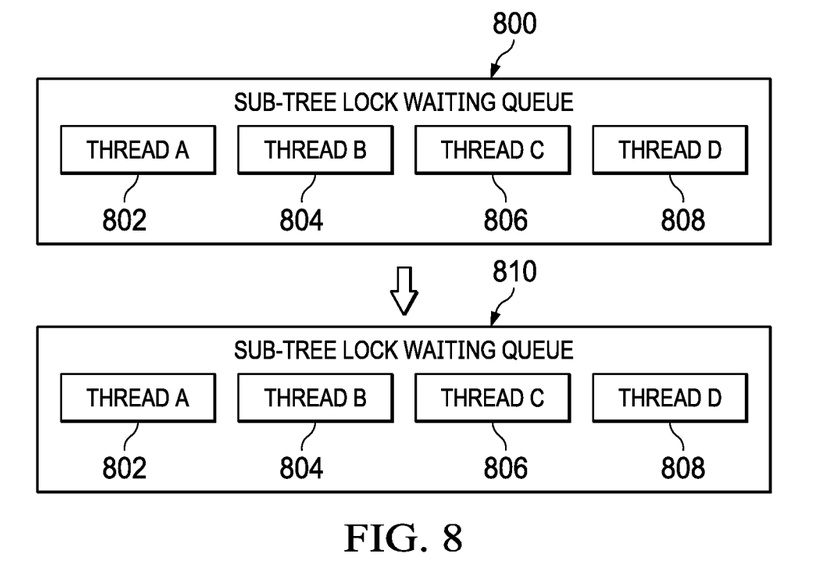
FIG. 8 is an illustration of a block diagram of reprioritizing a lock waiting queue in accordance with an illustrative embodiment.

Turning to FIG. 8, an illustration of a block diagram of reprioritizing lock waiting queue 800 is depicted in accordance with an illustrative embodiment. Lock waiting queue 800 is an example of one implementation of lock waiting queue 250 in FIG. 2.

Lock waiting queue 800 includes lock request thread A 802, lock request thread B 804, lock request thread C 806, and lock request thread D 808, in the order received. In this example, lock thread A 802 and lock thread C 806 are from a first database in a distributed database with shared data and lock thread B 804 and lock thread D 808 are from a different second database in the distributed database with shared data.

In accordance with an illustrative embodiment, the lock requests in lock waiting queue 800 are reprioritized in lock waiting queue 810. In lock waiting queue 810, lock requests from the same database are put next to each other in order that lock requests from the same database may be processed together in a batch operation to consolidate synchronous input/output on log wright.

Figure 9:
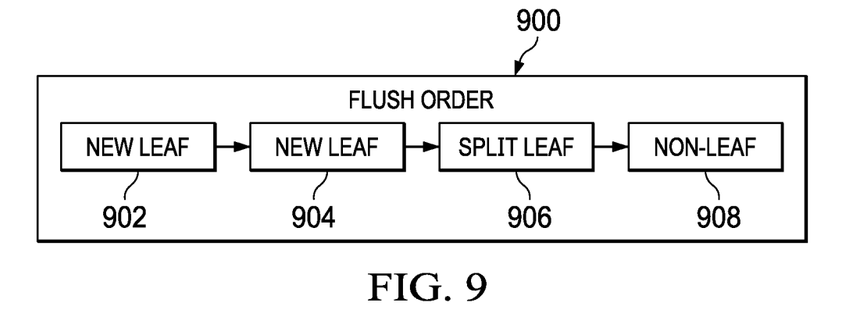
FIG. 9 is an illustration of a block diagram of flush order in accordance with an illustrative embodiment.

Turning to FIG. 9, an illustration of a block diagram of flush order 900 is depicted in accordance with an illustrative embodiment. Flush order 900 is an example of order 260 for flush 258 in FIG. 2.

Flush order 900 illustrates the preferred order for flushing nodes changed by a split tree operation. The preferred order is first the node for new leaf 902 created by the split operation, then the node for next leaf 904 after new leaf in the index tree, then the node for split leaf 906, which is the leaf node that was split by the split operation. The non-leaf 908 changed by the split operation is flushed last.

Figure 10:
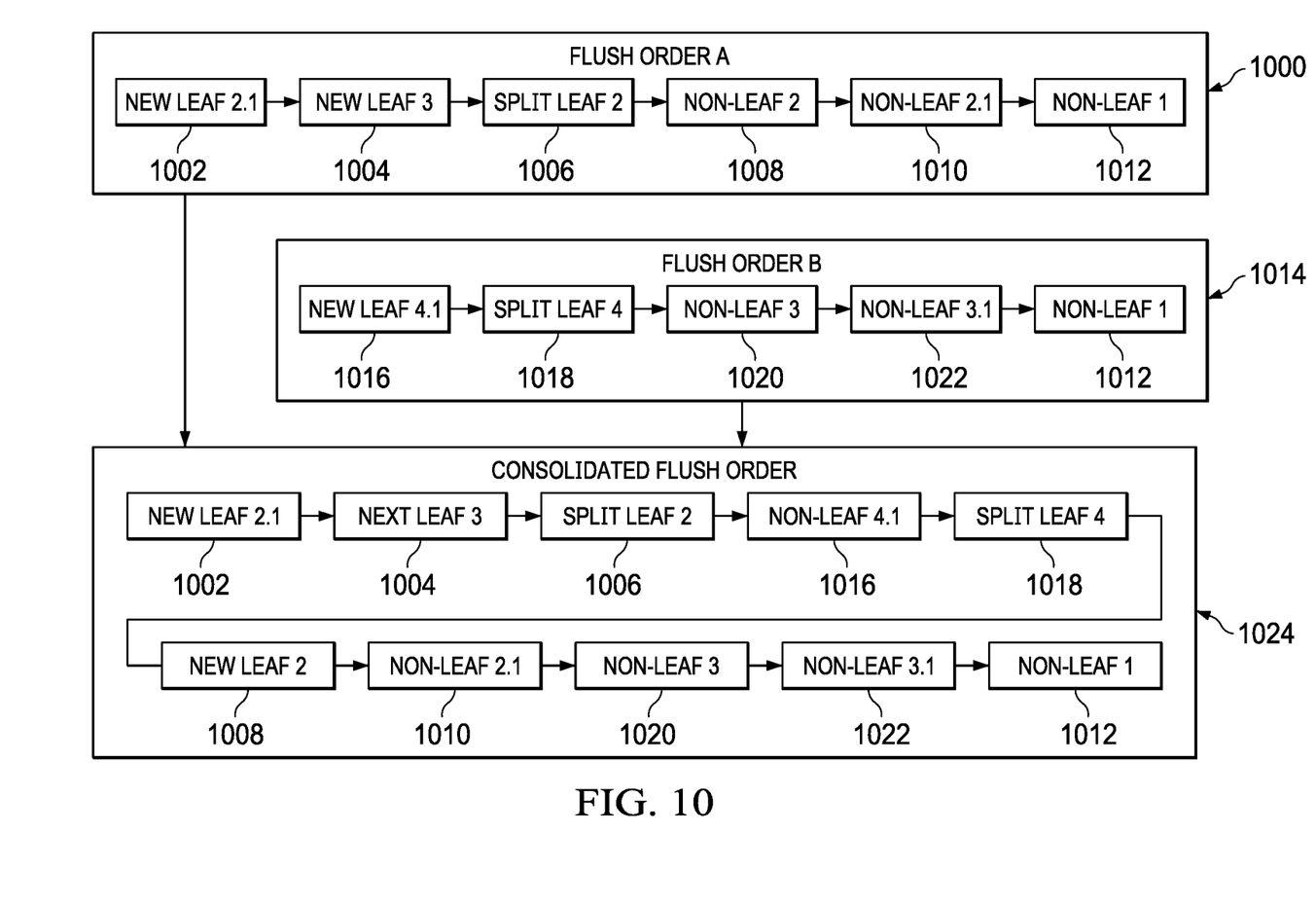
FIG. 10 is an illustration of a block diagram of consolidating flush order in accordance with an illustrative embodiment.

Turning to FIG. 10, an illustration of a block diagram of consolidating flush order is depicted in accordance with an illustrative embodiment. In this example, flush order A 1000 is an example of flush order 900 in FIG. 9 for a first tree split operation. The order in flush order A is new leaf 2.1 1002, new leaf 3 1004, split leaf 2 1006, split non-leaf 2 1008, new non-leaf 2.1 1010, and non-leaf 1 1012. Flush order B 1014 is an example of flush order 900 in FIG. 9 for a second tree split operation. The order in flush order B is new leaf 4.1 1016, split leaf 4 1018, split non-leaf 3 1020, new non-leaf 3.1 1022, and non-leaf 1 1012. Note that both flush order A 1000 and flush order B 1014 include non-leaf splits and flush order A 1000 and flush order B 1014 both include non-leaf 1 1012.

In accordance with an illustrative embodiment, non-leaf splits are supported by consolidating flush order A 1000 and flush order B 1014 into consolidated flush order 1024 to avoid synchronous input/output log write. The order for consolidated flush order 1024 is new leaf 2.1 1002, next leaf 3 1004, split leaf 2 1006, new leaf 4.1 1016, split leaf 4 1018, split non-leaf 2 1008, new non-leaf 2.1 1010, split non-leaf 3 1020, new non-leaf 3.1 1022, and non-leaf 1 1012.

Figure 11A:
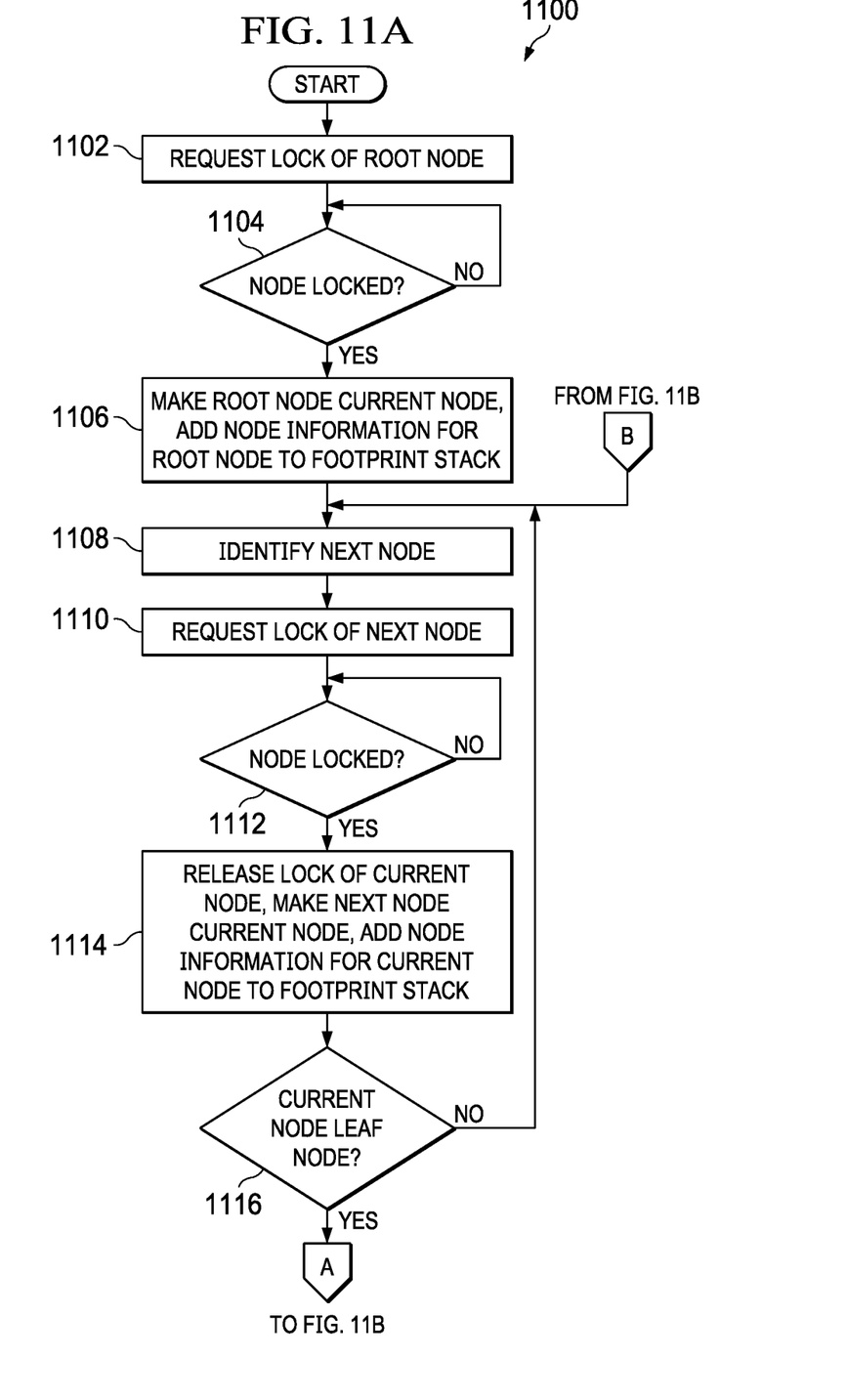
FIGS. 11A and 11B is an illustration of a flowchart of a process for modifying a database index in accordance with an illustrative embodiment.
Figure 11B:
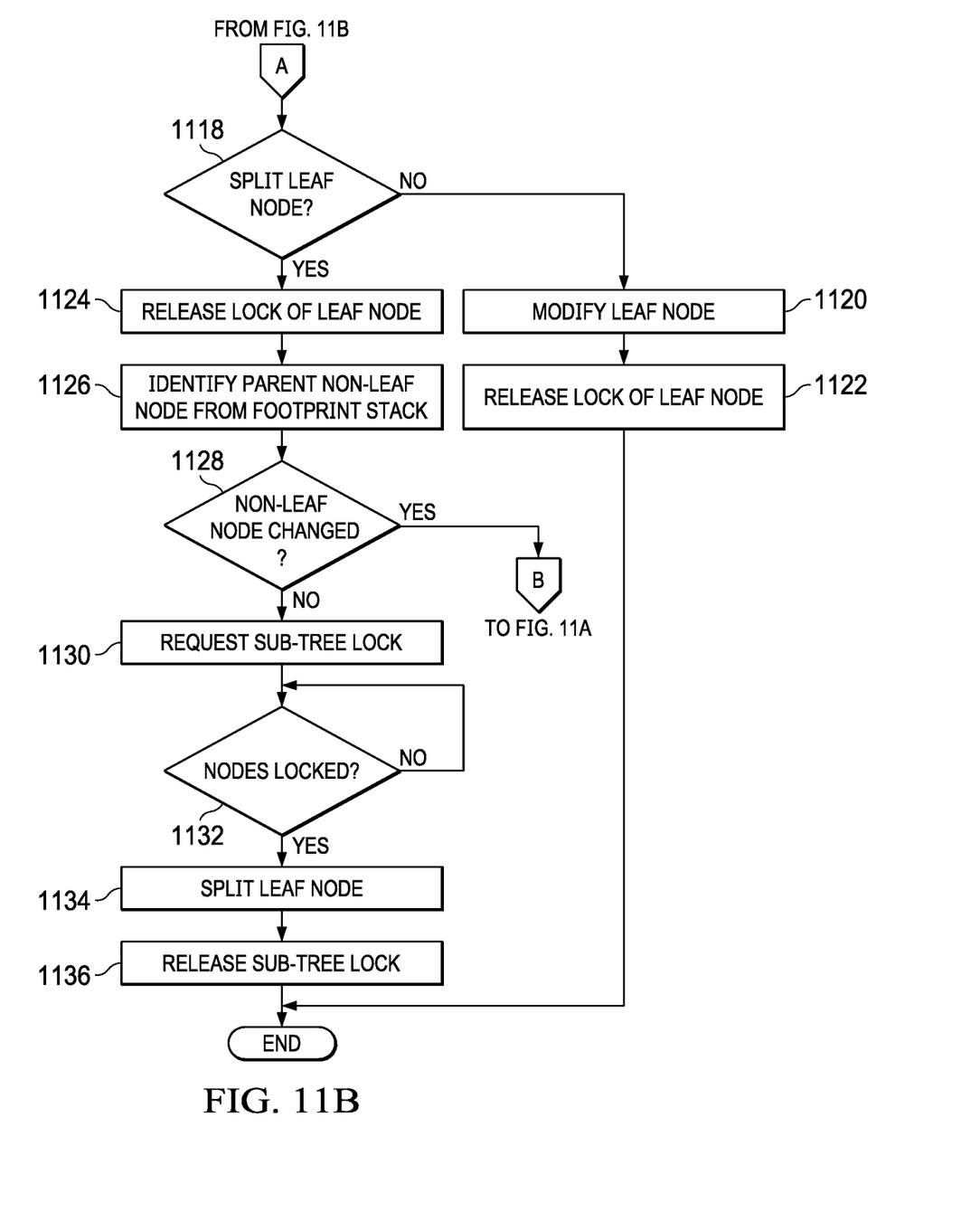

Turning to FIGS. 11A and 11B, an illustration of a flowchart of process 1100 for modifying a database index is depicted in accordance with an illustrative embodiment. Process 1100 may be implemented by index management processor 220 in FIG. 2 to add a new key to an index tree for a database.

Process 1100 begins with requesting a lock of the root node of the index tree (operation 1102). Process 1100 waits until it is determined that the root node is locked (operation 1104). In response to determining that the root node is locked, the root node is made the current node and node information for the root node is added to a footprint stack (operation 1106).

The next node in the index tree is then identified (operation 1108). A lock of the identified next node is requested (operation 1110). Process 1100 waits until it is determined that the next node is locked (operation 1112). In response to a determination that the next node is locked, the lock of the current node is released, the next node is made the current node, and node information for the current node is added to the footprint stack (operation 1114).

It is then determined whether the current node is a leaf node of the index tree (operation 1116). In response to a determination that the current node is not a leaf node, traversing of the index tree continues with identifying the next node in operation 1108.

In response to a determination at operation 1116 that the current node is a leaf node, it is determined whether the leaf node needs to be split (operation 1118). If the leaf node does not need to be split, the leaf node may be modified to add the new key to the leaf node (operation 1120) and the lock of the leaf node may then be released (operation 1122), with the process terminating thereafter.

In response to a determination at operation 1118 that the leaf node does need to be split, the lock of the leaf node may be released (operation 1124). The parent non-leaf node for the leaf node then may be identified from the information in the footprint stack (operation 1126). Timestamp information for the non-leaf node in the footprint stack may be used to determine whether the non-leaf mode has changed since the non-leaf node was traversed (operation 1128). If the non-leaf node has changed, the index tree may be re-traversed starting with the non-leaf node by returning to operation 1108.

In response to a determination at operation 1128 that the non-leaf node has not changed, a sub-tree lock starting with the non-leaf node is requested (operation 1130). Process 1100 waits unit the sub-tree is locked (operation 1132). In response to a determination that the sub-tree is locked, the leaf node is split (operation 1134). The sub-tree lock then may be released (operation 1136), with the process terminating thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 12:
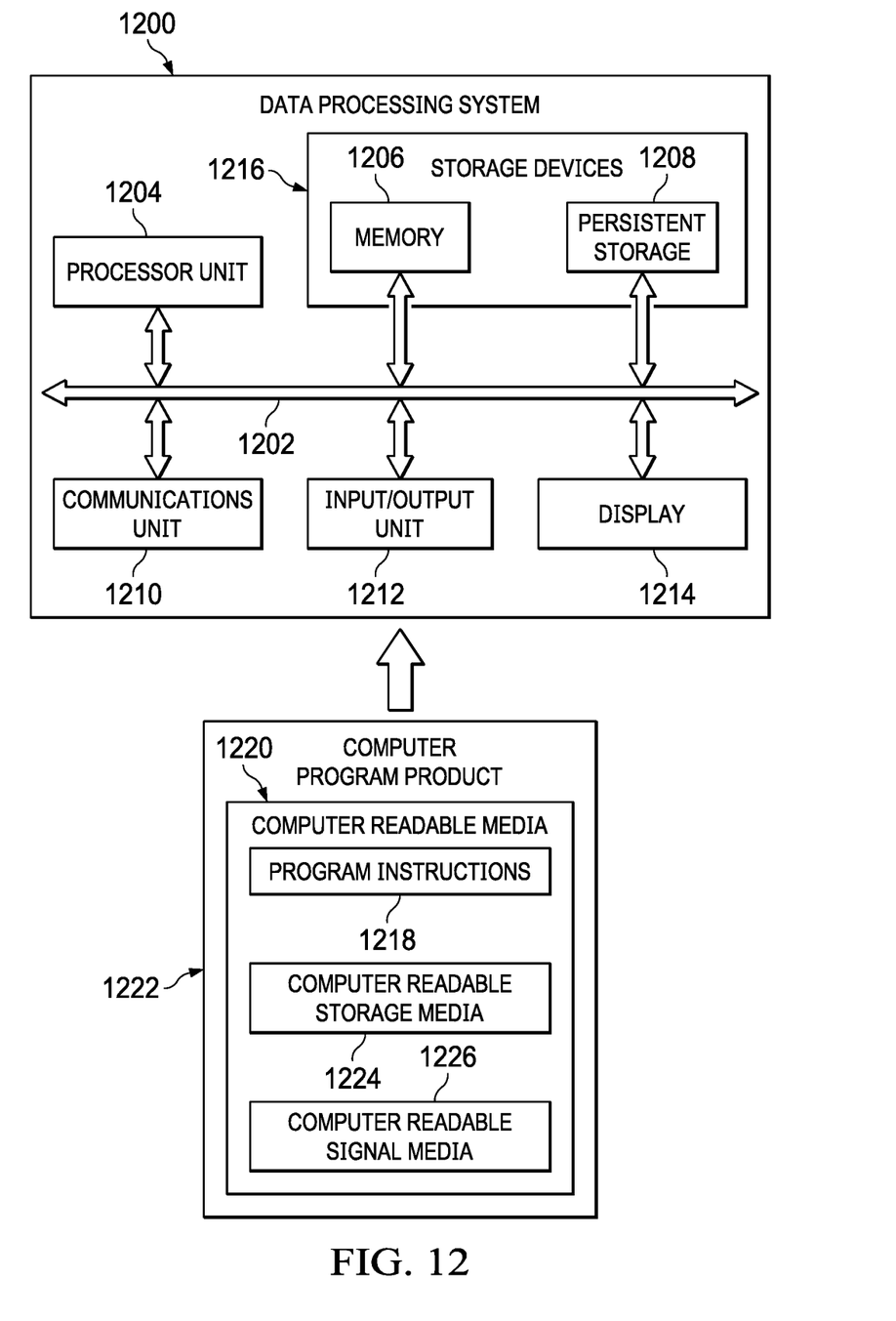
FIG. 12 is a block diagram of a data processing system in accordance with an illustrative embodiment.

Turning to FIG. 12, a block diagram of a data processing system is depicted in accordance with an illustrative embodiment. Data processing system 1200 can be used to implement server computer 104, server computer 106, client computer 110, client computer 112, and client computer 114 in FIG. 1. Data processing system 1200 can be used to implement computer system 230 in FIG. 2. The functionality of index management processor 220 of FIG. 2 as describe herein may be implemented by data processing system 1200. In this illustrative example, data processing system 1200 includes communications framework 1202, which provides communications between processor unit 1204, memory 1206, persistent storage 1208, communications unit 1210, input/output (I/O) unit 1212, and display 1214. In this example, communications framework 1202 takes the form of a bus system.

Processor unit 1204 serves to execute instructions for software that can be loaded into memory 1206. Processor unit 1204 includes one or more processors. For example, processor unit 1204 can be selected from at least one of a multicore processor, a central processing unit (CPU), a graphics processing unit (GPU), a physics processing unit (PPU), a digital signal processor (DSP), a network processor, or some other suitable type of processor. For example, further, processor unit 1204 can be implemented using one or more heterogeneous processor systems in which a main processor is present with secondary processors on a single chip. As another illustrative example, processor unit 1204 can be a symmetric multi-processor system containing multiple processors of the same type on a single chip.

Memory 1206 and persistent storage 1208 are examples of storage devices 1216. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1216 may also be referred to as computer-readable storage devices in these illustrative examples. Memory 1206, in these examples, can be, for example, a random-access memory or any other suitable volatile or non-volatile storage device. Persistent storage 1208 may take various forms, depending on the particular implementation.

For example, persistent storage 1208 may contain one or more components or devices. For example, persistent storage 1208 can be a hard drive, a solid-state drive (SSD), a flash memory, a rewritable optical disk, a rewritable magnetic tape, or some combination of the above. The media used by persistent storage 1208 also can be removable. For example, a removable hard drive can be used for persistent storage 1208.

Communications unit 1210, in these illustrative examples, provides for communications with other data processing systems or devices. In these illustrative examples, communications unit 1210 is a network interface card.

Input/output unit 1212 allows for input and output of data with other devices that can be connected to data processing system 1200. For example, input/output unit 1212 may provide a connection for user input through at least one of a keyboard, a mouse, or some other suitable input device. Further, input/output unit 1212 may send output to a printer. Display 1214 provides a mechanism to display information to a user.

Instructions for at least one of the operating system, applications, or programs can be located in storage devices 1216, which are in communication with processor unit 1204 through communications framework 1202. The processes of the different embodiments can be performed by processor unit 1204 using computer-implemented instructions, which may be located in a memory, such as memory 1206.

These instructions are referred to as program code, computer usable program code, or computer-readable program code that can be read and executed by a processor in processor unit 1204. The program code in the different embodiments can be embodied on different physical or computer-readable storage media, such as memory 1206 or persistent storage 1208.

Program instruction 1218 are located in a functional form on computer-readable media 1220 that is selectively removable and can be loaded onto or transferred to data processing system 1200 for execution by processor unit 1204. Program instructions 1218 and computer-readable media 1220 form computer program product 1222 in these illustrative examples. In the illustrative example, computer-readable media 1220 is computer-readable storage media 1224.

In these illustrative examples, computer-readable storage media 1224 is a physical or tangible storage device used to store program instructions 1218 rather than a medium that propagates or transmits program instructions 1218.

Alternatively, program instructions 1218 can be transferred to data processing system 1200 using a computer-readable signal media. The computer-readable signal media can be, for example, a propagated data signal containing program instructions 1218. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

The different components illustrated for data processing system 1200 are not meant to provide architectural limitations to the manner in which different embodiments can be implemented. In some illustrative examples, one or more of the components may be incorporated in or otherwise form a portion of, another component. For example, memory 1206, or portions thereof, may be incorporated in processor unit 1204 in some illustrative examples. The different illustrative embodiments can be implemented in a data processing system including components in addition to or in place of those illustrated for data processing system 1200. Other components shown in FIG. 12 can be varied from the illustrative examples shown. The different embodiments can be implemented using any hardware device or system capable of running program instructions 1218.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer-implemented method of modifying an index for a database, comprising:
   (A) traversing, by a process operating on a computer, an index tree for the database, by:
      (A.1) identifying a next node in the index tree,
      (A.2) preventing other processes from changing the next node by requesting a lock of the next node in the index tree,
      (A.3) responsive to locking of the next node in the index tree, allowing other processes to change a current node of the index tree by releasing a lock of the current node,
      (A.4) responsive to releasing the lock of the current node, making the next node in the index tree the current node of the index tree,
      (A.5) responsive to making the next node the current node, determining whether the current node of the index tree is a leaf node of the index tree, and
      (A.6) responsive to the process determining that the current node of the index tree is not a leaf node, repeating steps (A.1) through (A.6);
   (B) responsive to the process determining that the current node of the index tree is the leaf node, determining, by the process, whether to split the leaf node;
   (C) responsive to the process determining to split the leaf node, splitting the leaf node, by the process, by:
      (C.1) allowing other processes to change the leaf node by releasing the lock of the leaf node,
      (C.2) after releasing the lock of the leaf node, preventing other processes from changing a non-leaf node parent of the leaf node in the index tree by requesting a lock of the non-leaf node parent of the leaf node in the index tree,
      (C.3) after obtaining the lock of the non-leaf node parent of the leaf node, splitting the leaf node, and
      (C.4) after splitting the leaf node, allowing other processes to change the non-leaf node parent of the leaf node by releasing the lock of the non-leaf node parent of the leaf node; and
   (D) using the index, by a computer process, to access the database,
   wherein traversing the index tree for the database further comprises adding, by the process, node information for the current node to a footprint stack,
   wherein the node information added to the footprint stack includes node information for the current node selected from:
   a page buffer of the current node;
   a page free size of the current node; and
   a page modified timestamp indicating a last time that the current node was changed,
   wherein the method further comprises, before requesting the lock of the non-leaf node parent of the leaf node in the index tree:
      determining, by the process, using the page modified timestamp in the footprint stack for the non-leaf node parent of the leaf node, whether the non-leaf node parent of the leaf node has changed; and
      responsive to determining, by the process, that the non-leaf node parent of the leaf node has changed, re-traversing, by the process, the index tree for the database starting at the non-leaf node parent of the leaf node.

2. The computer-implemented method of claim 1 further comprising identifying, by the process, the non-leaf node parent of the leaf node from the footprint stack.

3. The computer-implemented method of claim 1, wherein the database is a distributed database with data shared by a plurality of databases, and further comprising using, by the process, node clusters to reduce contention against space map pages access when new pages are allocated.

4. The computer-implemented method of claim 1, wherein the database is a distributed database with data shared by a plurality of databases, wherein lock requests to lock nodes of index trees for the plurality of databases are stored in a lock waiting queue, and further comprising reprioritizing the lock requests in the lock waiting queue so that the lock requests to lock nodes of an index tree for a database in the plurality of databases are processed together in a batch operation.

5. A computer for modifying an index for a database, comprising:
   a bus system;
   a storage device connected to the bus system, wherein the storage device stores program instructions; and
   a processor connected to the bus system, wherein the processor executes the program instructions to cause a process to:
   (A) traverse an index tree for the database, by:
      (A.1) identifying a next node in the index tree,
      (A.2) requesting a lock of the next node in the index tree,
      (A.3) responsive to locking of the next node in the index tree, releasing a lock of a current node of the index tree,
      (A.4) responsive to releasing the lock of the current node of the index tree, making the next node in the index tree the current node of the index tree,
      (A.5) responsive to making the next node the current node, determining whether the current node of the index tree is a leaf node of the index tree, and
      (A.6) responsive to determining that the current node of the index tree is not a leaf node, repeating steps (A.1) through (A.6);
   (B) responsive to determining that the current node of the index tree is the leaf node, determine whether to split the leaf node;
   (C) responsive to determining to split the leaf node, split the leaf node by:
      (C.1) release the lock of the leaf node,
      (C.2) after releasing the lock of the leaf node, request a lock of a non-leaf node parent of the leaf node in the index tree,
      (C.3) after obtaining the lock of the non-leaf node parent of the leaf node, split the leaf node, and
      (C.4) after splitting the leaf node, release the lock of the non-leaf node parent of the leaf node; and (D) use the index to access the database,
wherein the processor executes the program instructions to cause the process to further add node information for the current node to a footprint stack,
wherein the node information added to the footprint stack includes node information for the current node selected from:
a page buffer of the current node;
a page free size of the current node; and
a page modified timestamp indicating a last time that the current node was changed,
wherein the determination of whether the non-leaf node parent has changed comprises causing the process to determine, using the page modified timestamp in the footprint stack for the non-leaf node parent of the leaf node, whether the non-leaf node parent of the leaf node has changed.

6. The computer of claim 5, wherein the processor executes the program instructions to cause the process to identify the non-leaf node parent of the leaf node from the footprint stack.

7. The computer of claim 5, wherein the database is a distributed database with data shared by a plurality of databases, and wherein the processor executes the program instructions to cause the process to further use node clusters to reduce contention against space map pages access when new pages are allocated.

8. The computer of claim 5, wherein the database is a distributed database with data shared by a plurality of databases, wherein lock requests to lock nodes of index trees for the plurality of databases are stored in a lock waiting queue, and wherein the processor executes the program instructions to cause the process to reprioritize the lock requests in the lock waiting queue so that the lock requests to lock nodes of an index tree for a database in the plurality of databases are processed together in a batch operation.

9. A computer program product for modifying an index for a database, the computer program product comprising a computer-readable storage medium having program instructions embodied therewith, the program instructions executable by a process operating on a computer to cause the process to perform a method of:
(A) traversing an index tree for the database, by:
  (A.1) identifying a next node in the index tree,
  (A.2) requesting a lock of the next node in the index tree,
  (A.3) responsive to locking of the next node in the index tree, releasing a lock of a current node of the index tree,
  (A.4) responsive to releasing the lock of the current node, making the next node in the index tree the current node of the index tree,
  (A.5) responsive to making the next node the current node, determining whether the current node of the index tree is a leaf node of the index tree, and
  (A.6) responsive to determining that the current node of the index tree is not a leaf node, repeating steps (A.1) through (A.6);
(B) responsive to determining that the current node of the index tree is the leaf node, determining whether to split the leaf node;
(C) responsive to determining to split the leaf node, splitting the leaf node by:
  (C.1) releasing the lock of the leaf node,
  (C.2) after releasing the lock of the leaf node, requesting a lock of a non-leaf node parent of the leaf node in the index tree,
  (C.3) after obtaining the lock of the non-leaf node parent of the leaf node, splitting the leaf node, and
  (C.4) after splitting the leaf node, releasing the lock of the non-leaf node parent of the leaf node; and
(D) using the index to access the database,
wherein the program instructions are executable by the computer to cause the process to add node information for the current node to a footprint stack,
wherein the node information added to the footprint stack includes node information for the current node selected from:
a page buffer of the current node;
a page free size of the current node; and
a page modified timestamp indicating a last time that the current node was changed,
wherein determining whether the non-leaf node parent has changed comprises determining, by the process, using the page modified timestamp in the footprint stack for the non-leaf node parent of the leaf node, whether the non-leaf node parent of the leaf node has changed.

10. The computer program product of claim 9, wherein the program instructions are executable by the computer to cause the process to identify the non-leaf node parent of the leaf node from the footprint stack.

11. The computer program product of claim 9, wherein the database is a distributed database with data shared by a plurality of databases, wherein lock requests to lock nodes of index trees for the plurality of databases are stored in a lock waiting queue, and wherein the program instructions are executable by the computer to cause the computer to further reprioritize the lock requests in the lock waiting queue so that the lock requests to lock nodes of an index tree for a database in the plurality of databases are processed together in a batch operation.

12. The computer program product of claim 9, wherein the database is a distributed database with data shared by a plurality of databases, and wherein the program instructions are executable by the computer to cause the computer to further use node clusters to reduce contention against space map pages access when new pages are allocated.

* * * * *